US009889515B2

(12) United States Patent
Mukai et al.

(10) Patent No.: US 9,889,515 B2
(45) Date of Patent: Feb. 13, 2018

(54) ELECTROCHEMICAL MACHINING TOOL, ELECTROCHEMICAL MACHINING SYSTEM, AND METHOD FOR MANUFACTURING PERFORATED MEMBER

(71) Applicant: MITSUBISHI HEAVY INDUSTRIES, LTD., Tokyo (JP)

(72) Inventors: Yosuke Mukai, Tokyo (JP); Kazuhisa Tamura, Tokyo (JP); Shin Asano, Tokyo (JP); Tetsuhei Kobayashi, Tokyo (JP); Tomofumi Shintani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 281 days.

(21) Appl. No.: 14/889,043

(22) PCT Filed: Feb. 14, 2014

(86) PCT No.: PCT/JP2014/053545
§ 371 (c)(1),
(2) Date: Nov. 4, 2015

(87) PCT Pub. No.: WO2014/185107
PCT Pub. Date: Nov. 20, 2014

(65) Prior Publication Data
US 2016/0074951 A1 Mar. 17, 2016

(30) Foreign Application Priority Data
May 16, 2013 (JP) .................................. 2013-104391

(51) Int. Cl.
*B23H 9/16* (2006.01)
*B23H 9/14* (2006.01)
(Continued)

(52) U.S. Cl.
CPC ................. *B23H 9/16* (2013.01); *B23H 3/04* (2013.01); *B23H 9/10* (2013.01); *B23H 9/14* (2013.01)

(58) Field of Classification Search
CPC ............... B23H 3/04; B23H 9/14; B23H 9/16
See application file for complete search history.

(56) References Cited

U.S. PATENT DOCUMENTS

| 6,290,461 B1 * | 9/2001 | Wei .......................... B23H 3/04 204/224 M |
|---|---|---|
| 6,582,584 B2 | 6/2003 | Lee et al. |

(Continued)

FOREIGN PATENT DOCUMENTS

| CN | 2362870 | 2/2000 |
|---|---|---|
| CN | 1636662 | 7/2005 |

(Continued)

OTHER PUBLICATIONS

First Office Action dated Jul. 4, 2016 in corresponding Chinese Application No. 201480021527.0 (with English translation).

(Continued)

*Primary Examiner* — Nicholas A Smith
(74) *Attorney, Agent, or Firm* — Wenderoth, Lind & Ponack, L.L.P.

(57) ABSTRACT

An electrochemical machining tool (3) includes a tool body (10) which has an electrode (11) which is made of a flexible conductive material having a cylindrical shape extending along an axis (O), and inside which an electrolyte (W) flows toward a leading end (10*a*) side, and an insulating layer (12) coated on an outer circumferential surface of the electrode (11) to expose a leading end surface of the electrode (11), wherein a non-insulation section (15) which exposes the outer circumferential surface of the electrode (11) is formed on the tool body (11), and the non-insulation section (15) is surrounded by the insulating layer (12) from an axial (O) direction.

3 Claims, 7 Drawing Sheets (51) Int. Cl.
  *B23H 3/04* (2006.01)
  *B23H 9/10* (2006.01)

(56) References Cited

U.S. PATENT DOCUMENTS

| | | | |
|---|---|---|---|
| 2009/0277803 A1 | 11/2009 | Wei et al. | |
| 2011/0070096 A1 | 3/2011 | Wei et al. | |
| 2012/0244010 A1 | 9/2012 | Wei et al. | |
| 2015/0231717 A1* | 8/2015 | Tamura | B23H 9/14 204/224 M |
| 2015/0273602 A1* | 10/2015 | Mukai | B23H 3/04 204/224 M |

FOREIGN PATENT DOCUMENTS

| | | | |
|---|---|---|---|
| GB | 1096985 | 12/1967 | |
| GB | 1130561 A * | 10/1968 | B23H 9/14 |
| JP | 8-99223 | 4/1996 | |
| JP | 2002-307249 | 10/2002 | |
| JP | 2003-507197 | 2/2003 | |
| JP | 2008-38774 | 2/2008 | |
| JP | 2008-229842 | 10/2008 | |
| JP | 2011-177819 | 9/2011 | |
| JP | 2012-35369 | 2/2012 | |
| KR | 2002-0022810 | 3/2002 | |

OTHER PUBLICATIONS

International Search Report dated Mar. 25, 2014 in corresponding International Application No. PCT/JP2014/053545.
International Preliminary Report on Patentability dated May 26, 2015 in corresponding International Application No. PCT/JP2014/053545 (with English Translation).
Notice of Preliminary Rejection dated Sep. 19, 2016 in corresponding Korean Application No. 10-2015-7027755 (with English translation).
Notice of Reasons for Rejection dated Aug. 16, 2016 in corresponding Japanese Application No. 2013-104391 (with English translation).

* cited by examiner

ELECTROCHEMICAL MACHINING TOOL, ELECTROCHEMICAL MACHINING SYSTEM, AND METHOD FOR MANUFACTURING PERFORATED MEMBER

TECHNICAL FIELD

The present invention relates to an electrochemical machining tool which performs electrochemical machining of a workpiece by performing electric conduction between an electrode and the workpiece via an electrolyte, and an electrochemical machining system equipped with the electrochemical machining tool.

Priority is claimed on Japanese Patent Application No. 2013-104391, filed May 16, 2013, the content of which is incorporated herein by reference.

BACKGROUND ART

Drilling of a hard-to-cut material which is hard to machine is generally performed by an electrochemical machining method and an electro-discharge machining method. In particular, when a hard-to-cut material having a high aspect ratio is drilled, the electrochemical machining method is used (e.g., Patent Literature 1).

Meanwhile, when a long hole is machined in a workpiece by the electrochemical machining, there is a need to increase the current to increase the machining speed. Although the applied voltage is generally increased to increase the current, it is preferable to limit the applied voltage to a low level for safety reasons and from the viewpoint of saving energy.

In view of such circumstances, as a method for increasing the machining speed without increasing the applied voltage, using a method for increasing an electric conduction area of the electrode used in the electrochemical machining by increasing the thickness of the electrode can be considered. However, the thickness of the electrode is restricted by the machining hole diameter and the amount of the electrolyte supplied to the electrode. Therefore, it is difficult to simply change the thickness of the electrode to increase the electric conduction area. Here, since the outer circumferential surface of the electrode is coated with an insulating member, it is also possible to increase the electric conduction area by peeling off the coating.

CITATION LIST

Patent Literature

[Patent Literature 1]
Japanese Unexamined Patent Application, First Publication No. 2012-35369

SUMMARY OF INVENTION

Technical Problem

However, when the coating of the electrode is uniformly peeled off to increase the electric conduction area, there is a possibility of peeling area increasing and the frequency of short-circuiting between the electrode and the workpiece increasing.

The present invention provides an electrochemical machining tool, an electrochemical machining system, and a method for manufacturing a perforated member which are capable of performing the electrochemical machining while limiting the frequency of short-circuiting and increasing the electric conduction area.

Solution to Problem

An electrochemical machining tool according to a first aspect of the present invention includes a tool body which has an electrode which is made of a flexible conductive material having a cylindrical shape extending along an axis, and inside which an electrolyte flows toward a leading end side, and an insulating layer coated on an outer circumferential surface of the electrode to expose a leading end surface of the electrode, wherein a non-insulation section which exposes the outer circumferential surface of the electrode is provided on the tool body, and the non-insulation section is surrounded by the insulating layer from at least one of an axial direction and a circumferential direction.

In such an electrochemical machining tool, by performing the electric conduction between the leading end surface of the electrode and the machining hole of the workpiece via the electrolyte, the workpiece is electrolyzed and the machining hole is deeply machined. At this time, it is possible to perform the electric conduction on the outer circumferential surface by the non-insulation section. Thus, the conduction area between the tool body and the workpiece is increased, and it is possible to improve the machining speed while limiting an increase in the applied voltage.

Since the non-insulation section is provided to be surrounded by the insulating layer, it is possible to reduce the frequency with which the non-contact portion comes into direct contact with the workpiece.

In the electrochemical machining tool according to a second aspect of the present invention, the non-insulation section in the first aspect may be provided in a ring shape extending over an entire region of the circumferential direction around the axis, and may be surrounded by the insulating layer from the axial direction.

By forming a ring-shaped non-insulation section, the insulating layer which surrounds the non-insulation section from the axial direction limits the contact of the non-insulation section with the workpiece. Therefore, it is possible to limit the frequency of short-circuiting while increasing the electric conduction area.

Further, for example, by forming a plurality of non-insulation sections to be disposed alternately with the insulating layer in the axial direction, even when an area per position of the ring-shaped non-insulation section is small, the total area of the non-insulation section can be increased. It is possible to limit the frequency of short-circuiting by the alternately disposed insulating layer while ensuring the conduction area even in this case.

In the electrochemical machining tool according to a third aspect of the present invention, the non-insulation section in the first aspect may be provided to extend to a trailing end side in the axial direction from the leading end of the tool body and may be surrounded by the insulating layer from the circumferential direction.

By providing the non-insulation section in this way, the insulating layer which surrounds the non-insulation section from the circumferential direction limits the contact of the non-insulation section with the workpiece. Therefore, it is possible to increase the electric conduction area and limit the frequency of short-circuiting.

In the electrochemical machining tool according to a fourth aspect of the present invention, a plurality of the non-insulation sections in the third aspect may be provided at intervals in the circumferential direction.

Since the plurality of the non-insulation sections surrounded by the insulating layer from the circumferential direction are provided in the circumferential direction, it is possible to further increase the electric conduction area while enabling the limitation of the frequency of short-circuiting. Thus, it is possible to further limit the applied voltage.

In the electrochemical machining tool according to a fifth aspect of the present invention, the non-insulation section in the first aspect may be provided to extend in the axial direction, and may be surrounded by the insulating layer from the circumferential direction and the axial direction.

Since the non-insulation section is provided in this way, the insulating layer may be provided on the outer circumferential surface of the leading end of the electrode. Thus, the short-circuiting at the leading end in which the tool body is liable to come into contact with the workpiece is prevented, and it is possible to further reduce the frequency of short-circuiting.

In the electrochemical machining tool according to a sixth aspect of the present invention, a plurality of the non-insulation sections in the fifth aspect may be provided at intervals in the circumferential direction.

By providing the plurality of non-insulation sections in the circumferential direction, it is possible to further increase the electric conduction area while enabling the limitation of frequency of short-circuiting. Thus, it is possible to further limit the applied voltage.

The electrochemical machining system according to a seventh aspect of the invention includes the electrochemical machining tool according to one aspect of the first to sixth aspects; a guide section which guides the electrochemical machining tool to be a predetermined advancing direction with respect to the workpiece; and a moving mechanism which advances the electrochemical machining tool.

In such an electrochemical machining system, the non-insulation section in the electrochemical machining tool may be provided to be surrounded by the insulating layer. Therefore, it is possible to reduce the frequency with which the non-contact portion comes into direct contact with the workpiece. Thus, it is possible to perform the electrochemical machining by limiting the frequency of short-circuiting while increasing the electric conduction area.

A method for manufacturing a perforated member according to an eighth aspect of the present invention includes forming a machining hole in the workpiece using the electrochemical machining tool according to one of the first to sixth aspects.

According to the method for manufacturing the perforated member, the non-insulation section in the electrochemical machining tool may be formed to be surrounded by the insulating layer. Therefore, it is possible to reduce the frequency with which the non-contact portion comes into direct contact with the workpiece. Thus, it is possible to perform the electrochemical machining while limiting the frequency of short-circuiting and increasing the electric conduction area.

Advantageous Effects of Invention

According to the electrochemical machining tool, the electrochemical machining system and the method for manufacturing the perforated member of the present invention, since the non-insulation section is surrounded by the insulating layer from at least one of the axial direction and the circumferential direction, it is possible to perform the electrochemical machining while limiting the frequency of short-circuiting and increasing the electric conduction area.

BRIEF DESCRIPTION OF DRAWINGS

FIGS. 2(a) to 2(c) show an electrochemical machining system according to the first embodiment of the present invention.

FIGS. 3(a) to 3(c) show an electrochemical machining system according to a second embodiment of the present invention.

FIGS. 4(a) to 4(c) show an electrochemical machining system according to the second embodiment of the present invention.

FIGS. 5A to 5C show an electrochemical machining system according to a third embodiment of the present invention.

FIGS. 6(a) to 6(c) show an electrochemical machining system according to a fourth embodiment of the present invention.

FIGS. 7(a) to 7(c) show an electrochemical machining system according to a fifth embodiment of the present invention.

DESCRIPTION OF EMBODIMENTS

[First Embodiment]

Hereinafter, an electrochemical machining system according to a first embodiment of the present invention will be described.

An electrochemical machining system 1 is a device that forms a linear machining hole 101 in a workpiece 100. As an example in the present embodiment, the workpiece 100 is a turbine blade of a gas turbine, and the machining hole 101 of the workpiece 100 is a cooling hole which cools the turbine blades.

A method for manufacturing the workpiece 100 having the machining hole 101, that is, a method for manufacturing the perforated member, will be described with reference.

Figure 1:
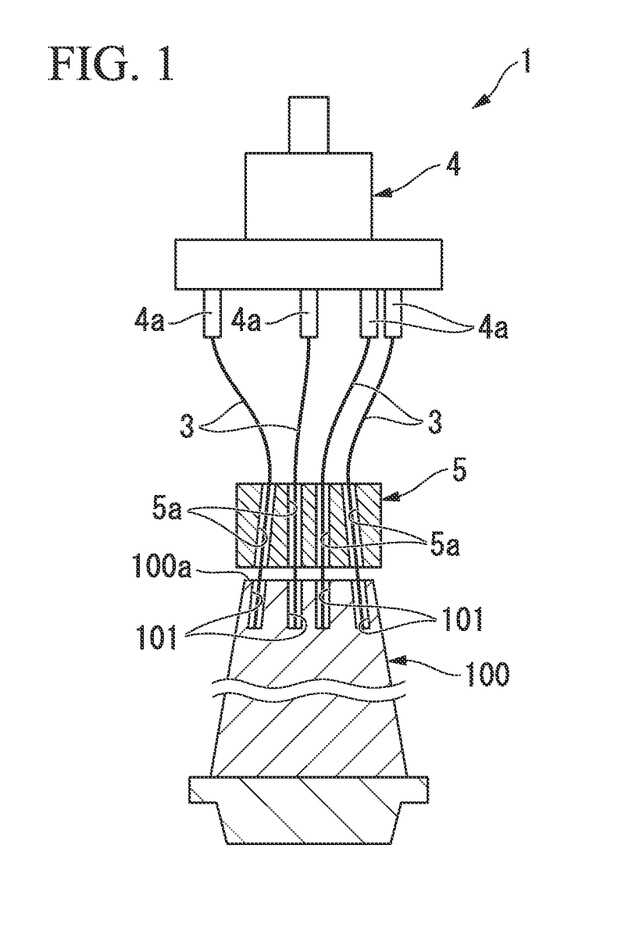
FIG. 1 is an overall schematic view showing an electrochemical machining system according to a first embodiment of the present invention.

As shown in FIG. 1, the electrochemical machining system 1 includes a plurality of electrochemical machining tools 3 which form the machining hole 101 in the workpiece 100, a moving mechanism 4 which advances the electrochemical machining tool 3, and a guide section 5 which guides the electrochemical machining tool 3 while the electrochemical machining tool 3 is advanced. The moving mechanism 4 may have a function of rotating the electrochemical machining tool 3, and the electrochemical machining system 1 may have a configuration having a single electrochemical machining tool 3 as well as a configuration having a plurality of electrochemical machining tool 3.

The moving mechanism 4 moves the electrochemical machining tool 3 forward and backward with respect to the workpiece 100. The moving mechanism 4 of this embodiment is disposed on a leading end 100a side of a turbine blade as the workpiece 100, and is movable forward and backward with respect to the leading end 100a. The moving mechanism 4 may rotate and advance the electrochemical machining tool 3.

The moving mechanism 4, for example, performs the forward and backward movement of the electrochemical machining tool 3 using a drive source such as an electric motor (not shown).

Figure 2:
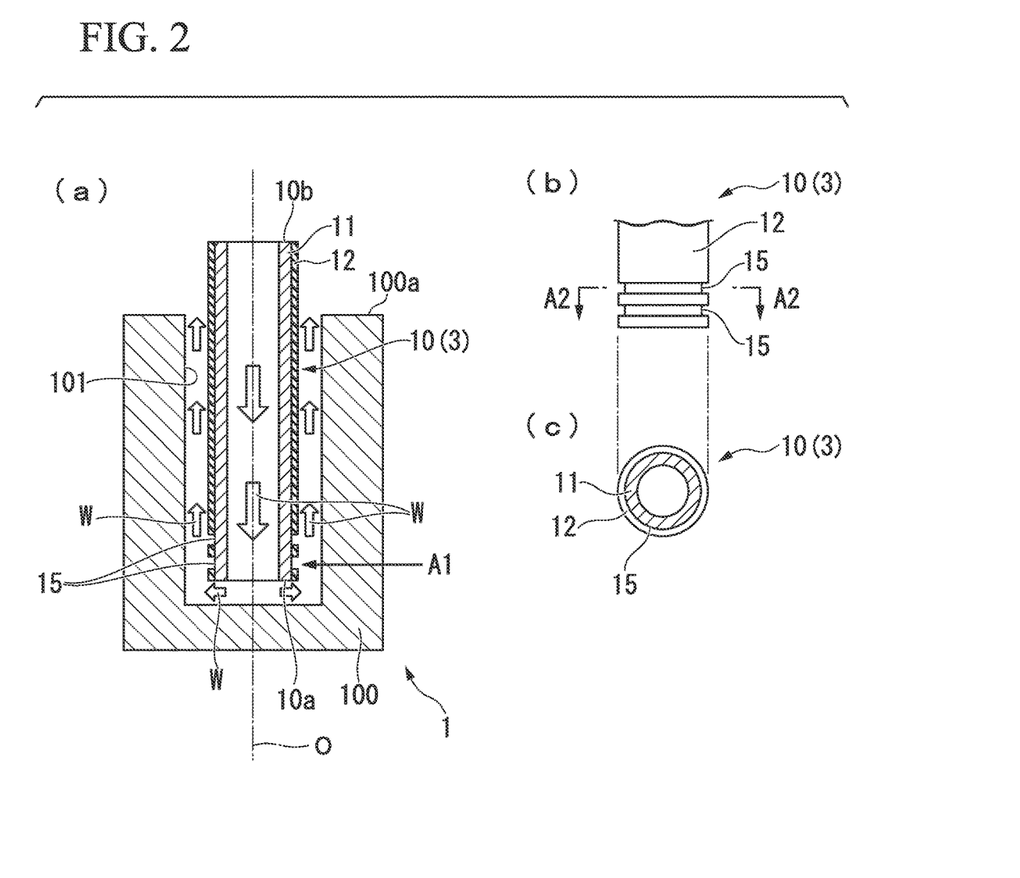
FIG. 2(a) is a longitudinal sectional view showing an electrochemical machining tool and the workpiece.
FIG. 2(b) is a diagram taken from an arrow A1 of FIG. 2(a)
FIG. 2(c) is a cross-sectional view taken from a line A2-A2 of FIG. 2(b).

The moving mechanism 4 has a plurality of gripping sections 4a that grip a proximal end (a proximal end 10b described later) of the electrochemical machining tool 3 on the surface of the workpiece 100 side. The gripping section 4a has a cylindrical shape with a hollow interior, and is capable of gripping the electrochemical machining tool 3 when the leading end of the electrochemical machining tool 3 is inserted into one end side thereof. Further, the other end side of the gripping section 4a is connected to an electrolyte flow passage (not shown), and the electrolyte W (see FIG. 2) is supplied to the interior of the gripping section 4a via the electrolyte flow passage. The supply amount of the electrolyte W is arbitrarily adjusted by a flow rate control device (not shown). As the electrolyte W, for example, sulfuric acid, nitric acid, saline and the like are used.

The guide section 5 is disposed between the moving mechanism 4 and the leading end 100a (a tip shroud of the turbine blade) of the workpiece 100. The guide section 5 guides the electrochemical machining tool 3 moved forward and backward by the moving mechanism 4 in a predetermined advancing direction with respect to the leading end 100a of the workpiece 100. A plurality of guide holes 5a are drilled through the guide section 5, and the guide holes allow the moving mechanism 4 side and the workpiece 100 side to communicate with each other. The electrochemical machining tool 3 is inserted into each of the guide holes 5a toward the workpiece 100 side from the moving mechanism 4 side. When the electrochemical machining tool 3 is advanced by the moving mechanism 4 in this state, it is possible to introduce the electrochemical machining tool 3 into a desired position at the leading end 100a of the workpiece 100 depending on the arrangement of the guide holes 5a, and at a desired angle with respect to the leading end 100a.

Next, the electrochemical machining tool 3 will be described.

The electrochemical machining tool 3 forms a machining hole (a cooling hole of the turbine blade) 101 in the workpiece 100 by the electrochemical machining. The electrochemical machining tool 3 has a tool body 10 which includes an electrode 11, and an insulating layer 12 which covers the electrode 11 from the outer circumference and has an overall cylindrical shape.

As shown in FIG. 2, a non-insulation section 15 in which a part of the outer circumferential surface is not covered with the insulating layer 12 and the electrode 11 is exposed is formed in the tool body 10.

The electrode 11 in the tool body 10 has a cylindrical shape extending along an axis O, and for example, the electrode 11 is formed of a conductive material having flexibility, such as stainless steel, copper and titanium. An inner hollow portion (the interior of the electrode 11) of the electrode 11 is in communication with the hollow portion of the gripping section 4a of the moving mechanism 4. Thus, the electrolyte W provided to the electrochemical machining flows inside the inner electrode 11 toward the leading end 10a side (the workpiece 100 side) from the proximal end 10b side (the moving mechanism 4 side) of the tool body 10.

The end surface of the electrode 11 on the leading end 10a side has a flat shape perpendicular to the axis O or a tapered shape (the flat shape in this embodiment). Although the electrode 11 has a cylindrical shape in this embodiment, the electrode 11 may have, for example, a rectangular shape with a polygonal cross section.

The insulating layer 12 in the tool body 10, for example, is formed of a polyester-based resin having electrical insulation properties. The insulating layer 12 is coated on an outer circumferential surface of the electrode 11. An end surface of the electrode 11 on the leading end 10a side is not covered with the insulating layer 12 and the electrode 11 is exposed.

The outer circumferential surface of the electrode 11 is exposed in a ring shape around the axis O over the whole area in the circumferential direction at an intermediate position near the leading end 10a between the leading end 10a and the proximal end 10b of the tool body 10, and thus the non-insulation section 15 is formed to radially face the workpiece 100. That is, the non-insulation section 15 is formed to be surrounded and sandwiched by the insulating layer 12 from the axial O direction. Further, in this embodiment, the two non-insulation sections 15 are formed at intervals in the axial O direction. The quantity of non-insulation sections 15 is not limited to two like in the present embodiment. At least one non-insulation section 15 may be formed.

The electric conduction between the non-insulation section 15 and the workpiece 100 can be performed via the electrolyte W derived from the leading end 10a of the tool body 10.

In such an electrochemical machining system 1, the electrolyte W flowing through the interior of the electrode 11 is derived from the leading end 10a of the tool body 10 by the electrochemical machining tool 3. Then, the electric conduction between the end surface of the leading end 10a of the tool body 10 and the inner surface of the machining hole 101 of the workpiece 100 is performed via the derived electrolyte W, the workpiece 100 is electrolyzed, and the machining hole 101 is more deeply formed in the axial O direction.

During machining, by forming the non-insulation section 15, the electric conduction between the workpiece 100 and the outer circumferential surface of the electrode 11 as well as the end surface facing the axial O direction in the leading end 10a of the tool body 10 can be performed. Therefore, the electric conduction area between the tool body and the workpiece 100 increases, and it is possible to improve the machining speed while limiting an increase in the applied voltage.

Furthermore, the non-insulation section 15 is formed to be surrounded by the insulating layer 12 from the axial O direction. For this reason, the insulating layer 12 can reduce the frequency of contact of the non-insulation section 15 with the workpiece 100. Here, by forming a plurality of ring-shaped non-insulation sections 15, even when an area for each non-insulation section 15 is small, the total area of the non-insulation section 15 can be increased.

According to the electrochemical machining system 1 of this embodiment, by forming the non-insulation section 15 to be surrounded by the insulating layer 12 from the axial O direction, it is possible to perform the electrochemical machining of the workpiece 100 while limiting the frequency of short-circuiting and increasing the electric conduction area.

[Second Embodiment]

Next, an electrochemical machining system 21 according to a second embodiment of the present invention will be described.

The components common to the first embodiment are denoted by the same reference numerals, and no detailed explanation thereof will be provided.

In this embodiment, a non-insulation section 25 formed in the tool body 10 is different from the first embodiment.

Figure 3:
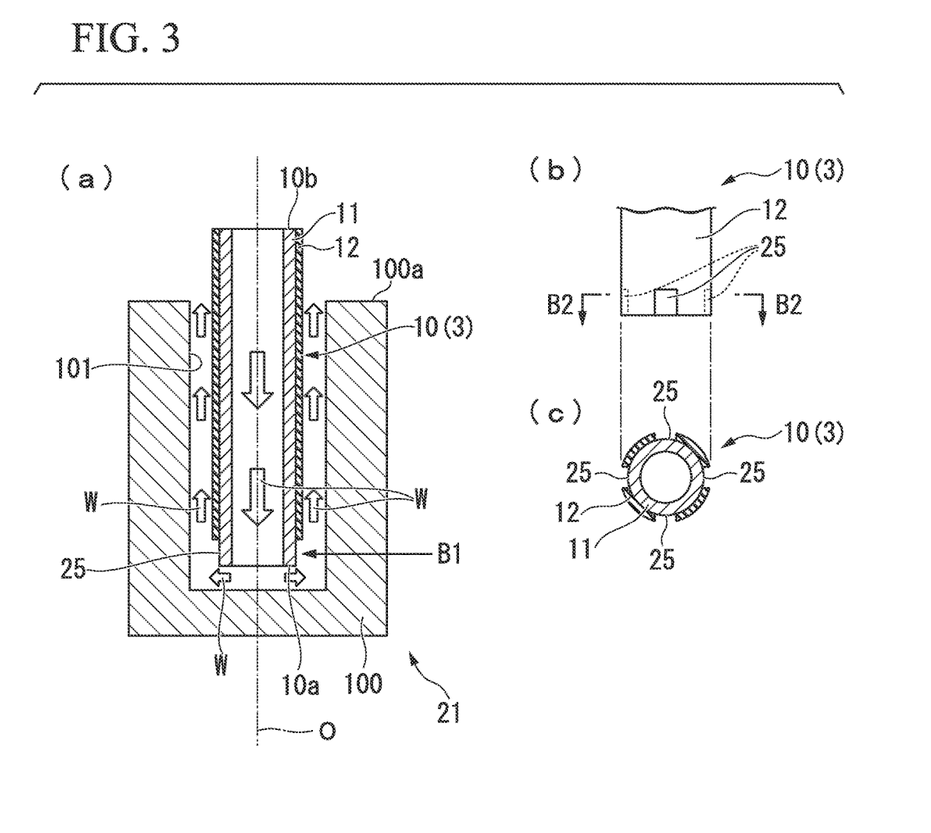
FIG. 3(a) is a longitudinal sectional view showing an electrochemical machining tool and the workpiece.
FIG. 3(b) is a diagram taken from an arrow 131 of FIG. 3(a)
FIG. 3(c) is a cross-sectional view taken from a line B2-B2 of FIG. 3(b).

As shown in FIG. 3, the non-insulation section 25 has a square shape on the outer circumferential surface of the electrode 11 when viewed from the radial direction. The non-insulation section 25 is formed to extend in the axial O direction to be continuous to the exposed portion of the electrode 11 at the end surface of the leading end 10a of the tool body 10. Thus, the non-insulation section 25 is formed to be surrounded by the insulating layer 12 from the circumferential direction. A plurality of the non-insulation sections 25 is formed to circumferentially alternate with the insulating layer 12 at regular intervals in the circumferential direction. As shown in FIG. 3(b), in this embodiment, the four non-insulation sections 25 are formed.

According to the electrochemical machining system 21 of this embodiment, the electric conduction between the outer circumferential surface of the electrode 11 and the workpiece 100 can be performed by the non-insulation section 25. For this reason, it is possible to increase the electric conduction area. In addition, the insulating layer 12 which surrounds the non-insulation section 25 from the circumferential direction limits the contact of the non-insulation section 25 with the workpiece 100. Therefore, it is possible to limit the frequency of short-circuiting while ensuring a conduction area between the tool body and the workpiece 100.

Also, by circumferentially forming a plurality of the non-insulation sections 25 surrounded by the insulating layer 12 from the circumferential direction, the electric conduction area is further increased and the applied voltage can be further limited while limiting the frequency of short-circuiting.

The shape of the non-insulation section 25 may be any of various shapes such as a circular shape or a polygonal shape when viewed from the radial direction, without being limited to the rectangular shape described above. That is, the non-insulation section 25 may be formed to be surrounded by the insulating layer 12 at least from the circumferential direction.

In this embodiment, the cross-sectional shape of the machining hole 101 has a flower shape which is radially enlarged only at a position at which the non-insulation section 25 is formed. Meanwhile, the electrochemical machining tool 3 may be rotated, and in this case, the machining hole 101 has a cross-sectional shape which is close to a perfect circle.

Figure 4:
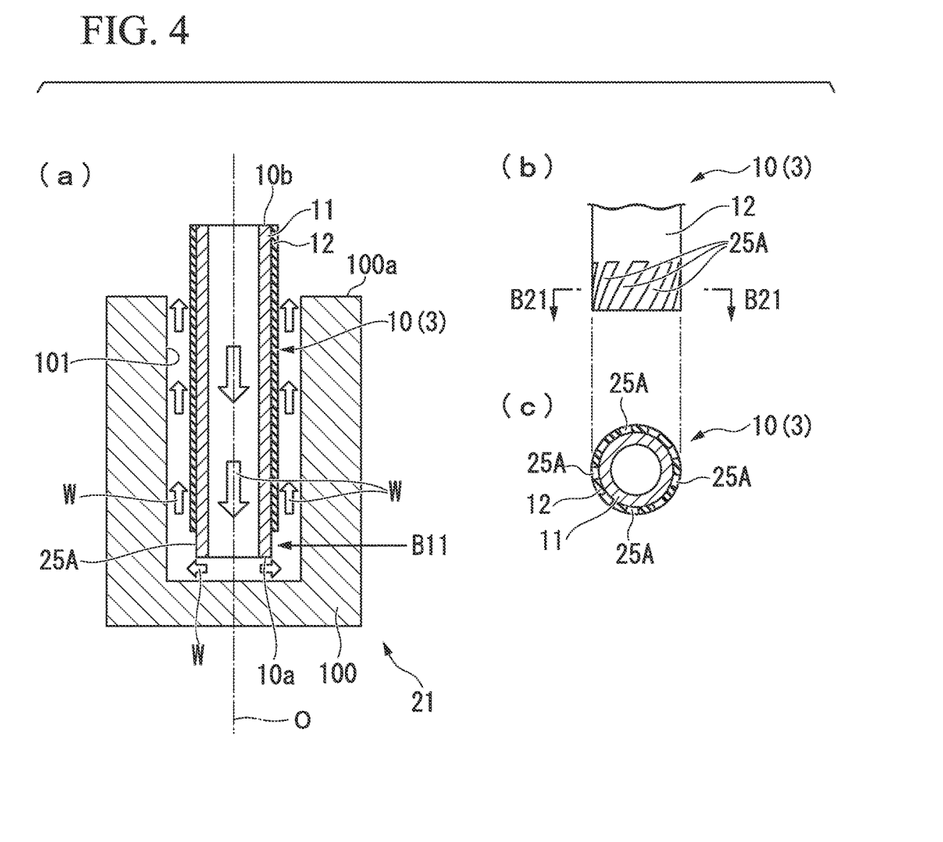
FIG. 4(a) is a longitudinal sectional view showing an electrochemical machining tool and the workpiece.
FIG. 4(b) is a diagram taken from an arrow B11 of FIG. 4(a)
FIG. 4(c) is a cross-sectional view taken from a line B21-B21 of FIG. 4(b).

Here, as shown in FIG. 4, a plurality of non-insulation sections 25A may be formed to incline toward one side in the circumferential direction as it extends toward the proximal end 10b side when seen from the radial direction. In this case, the adjacent non-insulation sections 25A are formed to overlap each other in the circumferential direction at different positions in the axial O direction. Thus, by advancing the electrochemical machining tool 3, the sectional shape of the machining hole 101 may be a perfect circle.

The non-insulation section 25A may have a shape which linearly inclines in the circumferential direction, and may be formed in a curved spiral shape.

[Third Embodiment]

Next, an electrochemical machining system 31 according to a third embodiment of the present invention will be described.

The same components as the first embodiment and second embodiment are denoted by the same reference numerals, and no detailed description thereof will be provided.

Here, when the electrochemical machining tool 3 is rotated as described above, the configuration of this embodiment may be adopted.

That is, in this embodiment, a non-insulation section 35 formed in the tool body 10 is different from the first embodiment and the second embodiment in that the machining is performed while the electrochemical machining tool 3 is rotated.

Figure 5:
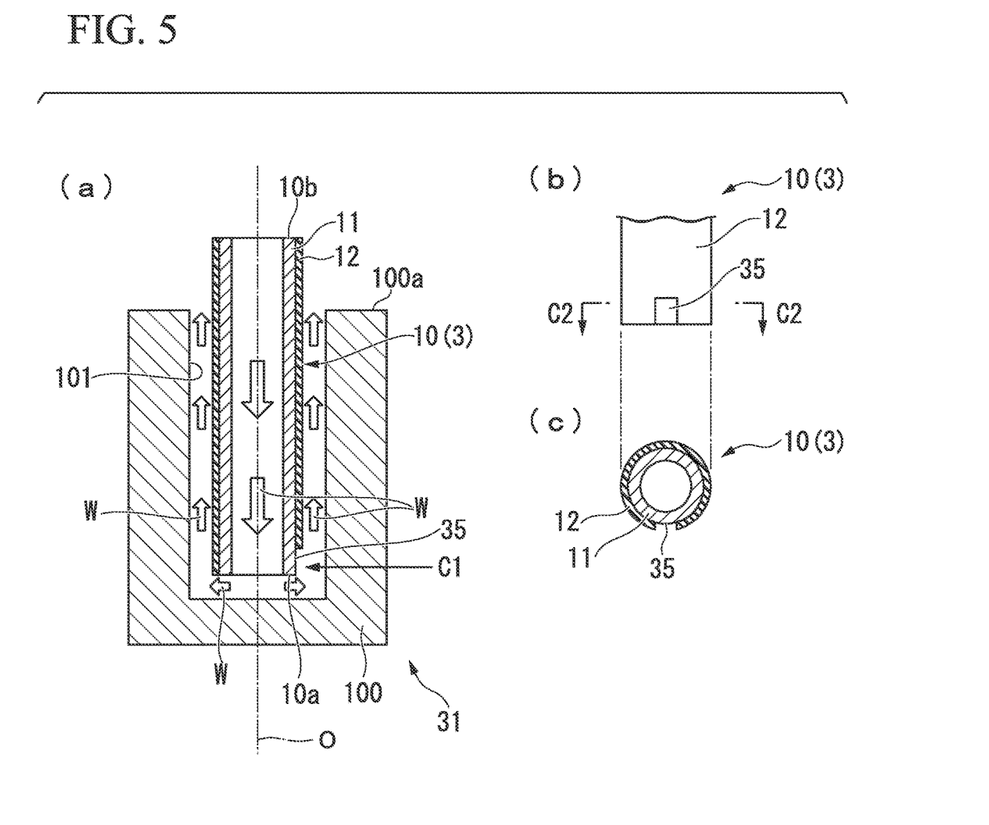
FIG. 5(a) is a longitudinal sectional view showing an electrochemical machining tool and the workpiece.
FIG. 5(b) is a diagram taken from an arrow C1 of FIG. 5(a)
FIG. 5(c) is a cross-sectional view taken from a line C2-C2 of FIG. 5(b).

As shown in FIG. 5, the non-insulation section 35 is similar to the non-insulation section 25 in the second embodiment, but only one is formed. That is, a portion in which the outer circumferential surface of the electrode 11 is exposed is present only at a circumferential position, and the exposed portion is surrounded by the insulating layer 12 from the circumferential direction.

According to the electrochemical machining system 31 of this embodiment, similarly to the second embodiment, it is possible to increase the electric conduction area between the tool body and the workpiece 100 by the non-insulation section 35. Moreover, the insulating layer 12 which surrounds the non-insulation section 35 from the circumferential direction limits the contact of the non-insulation section 35 with the workpiece 100. Therefore, it is possible to limit the frequency of short-circuiting while ensuring the conduction area between the tool body and the workpiece 100.

Although the non-insulation section 35 is formed only in a circumferential position in this embodiment, for example, by adjusting the rotational speed and the advancing speed of the electrochemical machining tool 3 in the moving mechanism 4, the machining of the machining hole 101 can be reliably performed. Therefore, the electrochemical machining can be performed while reducing the need to form the non-insulation section 35 in comparison to the second embodiment.

Even in this embodiment, similarly to the second embodiment, the shape of the non-insulation section 35 may be any of various shapes such as a circular shape or a polygonal shape when viewed from the radial direction.

[Fourth Embodiment]

Next, an electrochemical machining system 41 according to a fourth embodiment of the present invention will be described.

The same components as the first to third embodiments are denoted by the same reference numerals and no detailed description thereof will be provided.

In this embodiment, the non-insulation section 45 formed in the tool body 10 is different from the first to third embodiments.

Figure 6:
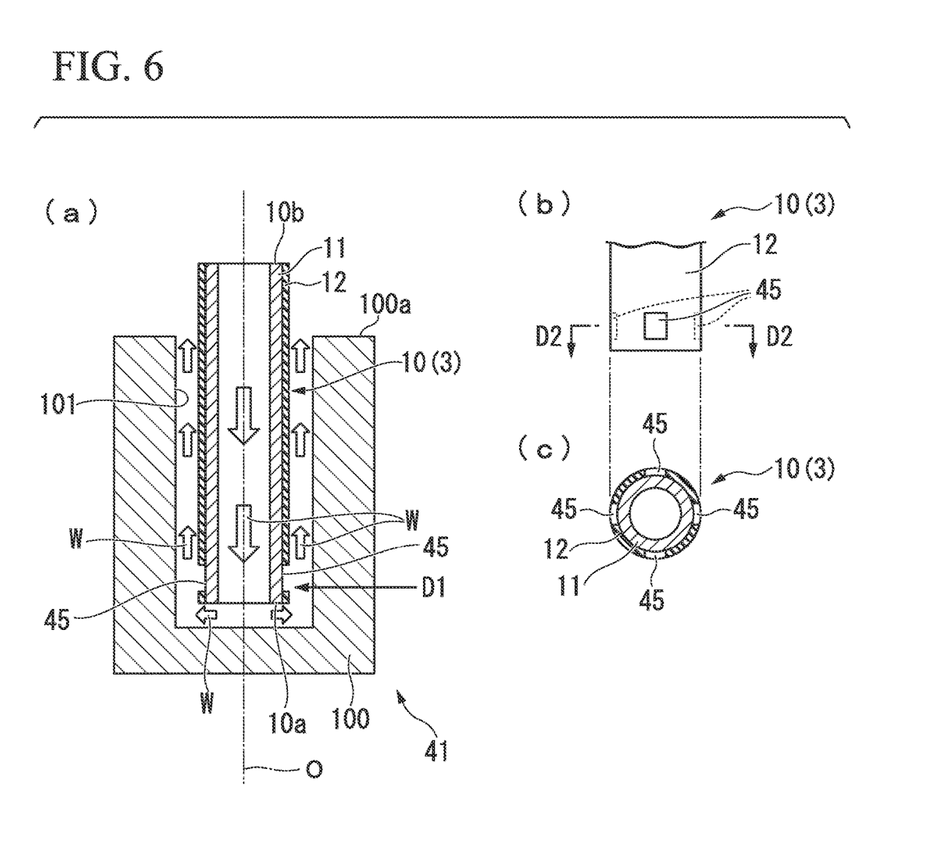
FIG. 6(a) is a longitudinal sectional view showing an electrochemical machining tool and the workpiece.
FIG. 6(b) is a diagram taken from an arrow D1 of FIG. 6(a)
FIG. 6(c) is a cross-sectional view taken from a line D2-D2 of FIG. 6(b).

As shown in FIG. 6, the non-insulation section 45 has a square shape on the outer circumferential surface of the electrode 11 when viewed from the radial direction. The non-insulation section 45 is formed to surround the insulating layer 12 with respect to the exposed portion of the electrode 11 at the end surface of the leading end 10a of the tool body 10, and extends in the axial O direction. Moreover, a plurality of the non-insulation sections 45 are formed to alternate circumferentially with the insulating layer 12 at regular intervals in the circumferential direction. As shown in FIG. 6(b) of this embodiment, four non-insulation sections 45 are formed. Thus, the non-insulation sections 45 are formed to be surrounded by the insulating layer 12 from the circumferential direction and the axial O direction.

According to the electrochemical machining system 41 of this embodiment, it is possible to increase the electric conduction area between the tool body and the workpiece 100 by the non-insulation section 45, and it is possible to limit the frequency of short-circuiting by the insulating layer 12 which surrounds the non-insulation section 45 from the circumferential direction.

The insulating layer 12 is formed on the outer circumferential surface at the leading end 10a of the tool body 10 by the non-insulation section 45. Therefore, since short-circuiting does not occur at the leading end 10a of the tool body 10 which is liable to come into contact with the workpiece 100, it is possible to further reduce the frequency of short-circuiting.

Moreover, by circumferentially forming the plurality the non-insulation sections 45 surrounded by the insulating layer 12 from the circumferential direction, the electric conduction area further increases while the frequency of short-circuiting is limited, and it is possible to improve the machining speed.

The shape of the non-insulation sections 45 may be any of various shapes such as a circular shape or a polygonal shape when viewed from the radial direction, without being limited to the rectangular shape described above. That is, the non-insulation sections 45 may be formed to be surrounded by the insulating layer 12 at least from the circumferential direction.

The non-insulation section 45 may be surrounded from the circumferential direction and the axial direction O, and for example, may be formed in a lattice shape when viewed from the radial direction, and a slit shape extending in the axial O direction or the circumferential direction.

Similarly to the second embodiment, in the present embodiment, the cross-sectional shape of the machining hole 101 is a flower shape in which a diameter is expanded only at the formation position of the non-insulation sections 45. Meanwhile, the electrochemical machining tool 3 may be rotated, and in this case, the machining hole 101 has a cross-sectional shape which is close to a perfect circle.

[Fifth Embodiment]

Next, an electrochemical machining system 51 according to a fifth embodiment of the present invention will be described.

The same components as the first to fourth embodiments are denoted by the same reference numerals, and no detailed description thereof will be provided.

Here, when the electrochemical machining tool 3 is rotated as described above, the configuration of this embodiment may be adopted.

That is, in this embodiment, a non-insulation section 55 formed in the tool body 10 is different from the first to fourth embodiments, and the machining is performed while the electrochemical machining tool 3 is rotated.

Figure 7:
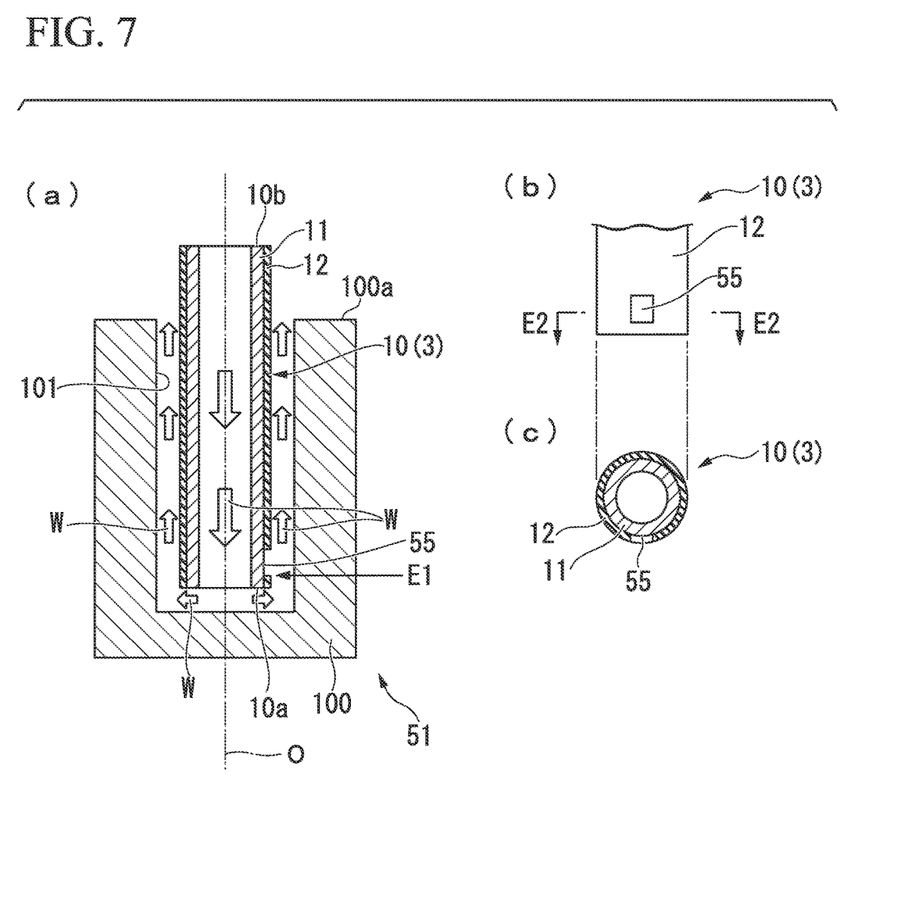
FIG. 7(a) is a longitudinal sectional view showing an electrochemical machining tool and the workpiece.
FIG. 7(b) is a diagram taken from an arrow E1 of FIG. 7(a)
FIG. 7(c) is a cross-sectional view taken from a line E2-E2 of FIG. 7(b).

As shown in FIG. 7, only one non-insulation section 55 similar to the non-insulation section 45 of the fourth embodiment is formed. That is, there is a portion in which the outer circumferential surface of the electrode 11 is exposed only in a location in the circumferential direction, and the exposed portion is surrounded by the insulating layer 12 from the circumferential direction and the axial O direction.

According to the electrochemical machining system 51 of this embodiment, similarly to the fourth embodiment, it is possible to increase the electric conduction area between the tool body and the workpiece 100 by the non-insulation sections 55, and it is possible to limit the frequency of short-circuiting.

Although the non-insulation section 55 is formed only in a part of the circumferential direction in this embodiment, for example, by appropriately adjusting the rotational speed and the advancing speed of the electrochemical machining tool 3 in the moving mechanism 4, it is possible to reliably perform the machining of the machining hole 101. Therefore, it is possible to perform the electrochemical machining while reducing the need to form the non-insulation section 55 in comparison to the fourth embodiment.

Even in this embodiment, similarly to the second to fourth embodiments, the shape of the non-insulation section 55 may be any of various shapes such as a circular shape or a polygonal shape when viewed from the radial direction.

The non-insulation section 55 may be surrounded from the circumferential direction and the axial direction O, and for example, the non-insulation section 55 may be formed in a lattice shape when viewed from the radial direction, and a slit shape extending in the axial O direction or the circumferential direction.

Although embodiments of the present invention have been described in detail, slight design changes are possible within the scope that does not depart from the technical idea of the present invention.

For example, a mixture of the non-insulation sections 15, 25 (25A), 35, 45 and 55 of the first to fifth embodiments may be formed.

Furthermore, although the non-insulation sections 15, 25 (25A), 35, 45 and 55 were formed at the position near the leading end 10a of the tool body 10 in the above embodiments, they are not limited to such a position. Also, the non-insulation sections may be formed in the entire range of the outer circumferential surface of the electrode 11, and in this case, the electric conduction area is further increased.

INDUSTRIAL APPLICABILITY

According to the electrochemical machining tool, the electrochemical machining system and the method for manufacturing a perforated member, since the non-insulation section is surrounded by the insulating layer from at least one of the axial direction and the circumferential direction, the electrochemical machining can be performed while limiting the frequency of short-circuiting and increasing the electric conduction area.

REFERENCE SIGNS LIST

1 Electrochemical machining system
3 Electrochemical machining tool
4 Moving mechanism
4a Gripping section
5 Guide section
5a Guide hole 10 Tool body
10a Leading end
10b Proximal end
11 Electrode
12 Insulating layer
15 Non-insulation section
100 Workpiece
100a Leading end
101 Machining hole
O Axis
W Electrolyte
21 Electrochemical machining system
25, 25A Non-insulation section
31 Electrochemical machining system
35 Non-insulation section
41 Electrochemical machining system
45 Non-insulation section
51 Electrochemical machining system
55 Non-insulation section

The invention claimed is:

1. An electrochemical machining tool comprising:
a tool body which has an electrode which is made of a flexible conductive material having a cylindrical shape extending along an axis, and inside which an electrolyte flows toward a leading end side, and an insulating layer coated on an outer circumferential surface of the electrode to expose a leading end surface of the electrode,
wherein a non-insulation section which exposes the outer circumferential surface of the electrode is provided on the tool body,
the non-insulation section is provided to extend to a trailing end side in the axial direction from the leading end of the tool body and is sandwiched by the insulating layer in the circumferential direction,
a plurality of the non-insulation sections are provided at intervals in the circumferential direction, and
the non-insulation sections are provided to incline toward one side in the circumferential direction as they extend toward the leading end side when seen from the radial direction, and the adjacent non-insulation sections are provided to overlap each other in the circumferential direction at different positions in the axial direction.

2. An electrochemical machining system comprising:
the electrochemical machining tool according to claim 1;
a guide section which guides the electrochemical machining tool in a predetermined advancing direction with respect to the workpiece; and
a moving mechanism which advances the electrochemical machining tool.

3. A method for manufacturing a perforated member comprising:
forming a machining hole in a workpiece using the electrochemical machining tool according to claim 1.

* * * * *